(12) United States Patent
Kim et al.

(10) Patent No.: US 12,031,549 B2
(45) Date of Patent: Jul. 9, 2024

(54) AIR COMPRESSOR FOR VEHICLE

(71) Applicant: Hanon Systems, Daejeon (KR)

(72) Inventors: Hyun Chil Kim, Daejeon (KR); Gunwoong Park, Daejeon (KR); Chi Yong Park, Daejeon (KR); Yeol Woo Sung, Daejeon (KR); Hyun Sup Yang, Daejeon (KR); Jong Sung Lee, Daejeon (KR); Kyu Sung Choi, Daejeon (KR)

(73) Assignee: Hanon Systems, Daejeon (KR)

( * ) Notice: Subject to any disclaimer, the term of this patent is extended or adjusted under 35 U.S.C. 154(b) by 0 days.

(21) Appl. No.: 17/799,738

(22) PCT Filed: Mar. 9, 2021

(86) PCT No.: PCT/KR2021/002896
§ 371 (c)(1),
(2) Date: Aug. 15, 2022

(87) PCT Pub. No.: WO2021/221294
PCT Pub. Date: Nov. 4, 2021

(65) Prior Publication Data
US 2023/0106824 A1 Apr. 6, 2023

(30) Foreign Application Priority Data
Apr. 27, 2020 (KR) .......... 10-2020-0050600

(51) Int. Cl.
*F04D 29/58* (2006.01)
*F04D 17/12* (2006.01)
(Continued)

(52) U.S. Cl.
CPC ....... *F04D 29/5806* (2013.01); *F04D 17/122* (2013.01); *F04D 25/06* (2013.01);
(Continued)

(58) Field of Classification Search
CPC ...... F04D 17/122; F04D 25/06; F04D 29/286; F04D 29/582; F04D 29/5806;
(Continued)

(56) References Cited

U.S. PATENT DOCUMENTS 5,497,615 A * 3/1996 Noe ........................ H02K 7/083
60/39.511
6,814,537 B2 * 11/2004 Olsen ........................ F01D 1/08
415/111

(Continued)

FOREIGN PATENT DOCUMENTS

JP     2001271797 A     10/2001
JP     2020033875 A     3/2020
(Continued)

*Primary Examiner* — Brian P Wolcott
*Assistant Examiner* — Behnoush Haghighian
(74) *Attorney, Agent, or Firm* — Norton Rose Fulbright US LLP; James R. Crawford

(57) ABSTRACT

The present invention relates to an air compressor for a vehicle and, more specifically, to an air compressor for a vehicle wherein the entire operation of the air compressor may be stabilized by a cooling unit in which a portion of the compressed air that moves through a connection pipe conveying primarily compressed air exchanges heat with a cooling water flowing part to cool the driving unit.

15 Claims, 9 Drawing Sheets

(51) Int. Cl.
    *F04D 25/06*     (2006.01)
    *F04D 29/056*     (2006.01)
    *F04D 29/28*     (2006.01)
    *F04D 29/42*     (2006.01)
    *F04D 29/44*     (2006.01)

(52) U.S. Cl.
    CPC ......... *F04D 29/056* (2013.01); *F04D 29/286* (2013.01); *F04D 29/4206* (2013.01); *F04D 29/441* (2013.01); *F04D 29/582* (2013.01)

(58) Field of Classification Search
    CPC .. F04D 29/441; F04D 29/4206; F04D 29/056; F04D 29/584; Y02E 60/50
    See application file for complete search history.

(56) References Cited

U.S. PATENT DOCUMENTS

| | | | |
|---|---|---|---|
| 8,402,771 B2 * | 3/2013 | Isomura | F02C 7/08 |
| | | | 60/806 |
| 9,267,437 B2 * | 2/2016 | Perry | F23D 11/105 |
| 2008/0136190 A1 * | 6/2008 | Lee | H02K 7/1823 |
| | | | 290/52 |
| 2017/0175564 A1 * | 6/2017 | Schlak | F01D 15/10 |

FOREIGN PATENT DOCUMENTS

| | | |
|---|---|---|
| KR | 100661702 B1 | 12/2016 |
| KR | 101810430 B1 | 12/2017 |
| KR | 20190031906 A | 3/2019 |

\* cited by examiner

AIR COMPRESSOR FOR VEHICLE

CROSS REFERENCE TO RELATED APPLICATION

This application is a national phase under 35 U.S.C. § 371 of International Application No. PCT/KR2021/002896 filed on Mar. 9, 2021, which claims the benefit of priority from Korean Patent Application No. 10-2020-0050600 filed on Apr. 27, 2020. The entire contents of these applications are incorporated herein by reference in their entirety.

TECHNICAL FIELD

The present invention relates to an air compressor for a vehicle, and more specifically, to an air compressor for a vehicle wherein an entire operation of the air compressor may be stabilized by a cooling unit in which a portion of compressed air that moves through a connection pipe conveying primarily compressed air exchanges heat with a cooling water flowing part to cool a driving unit.

BACKGROUND ART

In general, a fuel cell vehicle may indicate a vehicle in which hydrogen and oxygen are supplied to a humidifier and electric energy generated through an electrochemical reaction, which is a reverse reaction of electrolysis of water, is supplied as a driving force of the vehicle, and such a general fuel cell vehicle is disclosed in Korean Patent No. 10-0962903.

In general, a passenger fuel cell vehicle may mount a 100 kW fuel cell stack therein. When the fuel cell stack is operated under pressure, air supplied to the fuel cell stack may be supplied at a high pressure of 1 to 4 bars. Therefore, it is necessary to use an air compressor having a rotational speed of 100,000 to 200,000 RPM.

The fuel cell vehicle may typically include the fuel cell stack producing electricity, a humidifier increasing humidity of air supplied to the fuel cell stack, a fuel supply unit supplying hydrogen to the fuel cell stack, an air supply unit supplying air including oxygen to the fuel cell stack, a cool module cooling the fuel cell stack and the like.

The air supply unit may include an air cleaner filtering out a foreign material included in air, the air compressor compressing air filtered by the air cleaner and supplying the same, a cooling device cooling pressurized hot air, a humidifier increasing humidity of air, and a valve adjusting a flow rate.

The above-described air compressor may compress air sucked from the outside by using an impeller of the compressor and then convey the same to the fuel cell stack.

Here, the impeller of the compressor may be connected to a rotation shaft receiving power from the driving unit, and in general, the driving unit may drive the rotation shaft by electromagnetic induction of a stator and rotor.

In this case, the air compressor may have heat loss occurring in an air bearing due to air resistance caused by a high-speed rotation of the rotor, and it may thus be necessary to cool a motor and the bearing, which are its main heat sources. Therefore, proposed is a structure in which the motor and bearing for rotating the impeller are cooled by utilizing a portion of compressed air produced by the impeller of the air compressor, and compressed air is then introduced into an inlet of the impeller again through an inner hole of the rotation shaft of the motor.

In this regard, Korean Patent No. 10-1810430 discloses an air compressor in which an inner air flow is circulated using an end of a motor shaft, and a fuel cell vehicle thereof, the air compressor including: a drive housing embedding a rotor and a stator therein; a motor shaft including an air discharge hole drilled through the drive housing; an air bearing coupled to a housing-rear end of the drive housing to support a shaft-rear end of the motor shaft; and a motor cooling path in which cool air, collected from an impeller chamber through an inner space of the drive housing to a chamber outside the motor, is extracted from compressed air generated by the impeller, is sucked into an air discharge hole, and then is discharged from the shaft-rear end to a shaft-front end.

However, such a conventional air compressor has a problem that compressed air may have a reduced flow rate and a delayed air flow, while passing through a narrow space around an air foil bearing, thereby lowering a self-cooling efficiency by the compressed air.

RELATED ART DOCUMENT

[Patent Document]
(Patent Document 1) Korean Patent No. 10-1810430 (registered on Dec. 13, 2017)

DISCLOSURE

Technical Problem

An object of the present invention is to provide an air compressor for a vehicle wherein an entire operation of the air compressor may be stabilized by a cooling unit in which a portion of compressed air that moves through a connection pipe conveying primarily compressed air exchanges heat with a cooling water flowing part to cool a driving unit.

Another object of the present invention is to provide an air compressor for a vehicle, which may smoothly cool the driving unit (i.e., air compressor for a vehicle) without requiring a configuration for separately inputting air to use compressed air and a configuration for discharging compressed air which completes the cooling of the driving unit, by performing the cooling using primarily compressed air, and then conveying the same to an inlet (i.e. front inlet) of a first compression unit.

Another object of the present invention is to provide an air compressor for a vehicle, having sufficient cooling performance by including a first cooling unit cooling a rotor and a bearing by conveying compressed air, cooled by exchanging heat with cooling water while compressed air moves through a first flow path of a motor housing, through a second flow path of a rear cover, a second cooling unit cooling a front impeller through a first through hole of the front impeller and a third cooling unit bypassing the rotor and cooling the inside of the motor housing, and by further including an open shaft unit enabling a portion of compressed air in a rear inlet to be further cooled while moving from a rear in the rotor to a front thereof in an axial direction.

Another object of the present invention is to provide an air compressor for a vehicle, which may have an improved cooling performance of a rotor disk in contact with first and second thrust bearings by including a 2-2-th flow path of a rear cover, which is inclined in a direction in which a rotor is rotated, and make a flow of compressed air for performing cooling smoother by adjusting a cross-sectional area of a cooling unit.

Technical Solution

In one general aspect, an air compressor 1000 for a vehicle may include: a first compression unit 100 including a front housing 110 having a front inlet 111 into which air to be compressed is introduced and a front outlet 112 from which compressed air is discharged, and a front impeller 120 positioned in the front housing 110; a second compression unit 200 including a rear housing 210 having a rear inlet 211 which is connected to the front outlet 112 of the first compression unit 100 through a connection pipe 400, and into which air passing through the first compression unit 100 is introduced and a rear outlet 212 from which compressed air is discharged, and a rear impeller 220 positioned in the rear housing 210; a driving unit 300 having the front housing 110 and the rear housing 210 respectively positioned on the front and rear thereof, and including a motor housing 310 having a cooling water flowing part 313 in which cooling water flows, a stator 300a coupled to an inner peripheral surface of the motor housing 310, a rotor 301 rotated in the stator 300a and a rotor disk 302 integrally formed with the rotor 301 to drive the front impeller 120 and the rear impeller 220; and a cooling unit 500 into which a portion of compressed air compressed by the first compression unit 100 and flowing through the connection pipe 400 is introduced, exchanges heat with the cooling water to cool the driving unit 300.

In addition, the air compressor 1000 for a vehicle may be a rear runner type in which the rotor disk 302 is positioned at the rear, and the cooling unit 500 may be positioned long in a length direction of the motor housing 310, and include a first flow path 311 exchanging heat with the cooling water flowing part 313.

In addition, the first flow path 311 may include a 1-1-th flow path 311-1 for conveying compressed air from the outer peripheral surface to inner center of the motor housing 310, and a 1-2-th flow path 311-2 for conveying compressed air from the 1-1-th flow path 311-1 to the rear thereof.

In addition, the air compressor 1000 for a vehicle may further include a rear cover 330 and a diffuser 340, positioned between the motor housing 310 and the rear housing 210 to support the rotor disk 302, wherein the rear cover 330 includes a second flow path 333 for receiving compressed air conveyed from the first flow path 311 and conveying the same to the rotor disk 302.

In addition, the second flow path 333 may include a 2-1-th flow path 333-1 open for communicating with the 1-2-th flow path 311-2, and a 2-2-th flow path 333-2 for conveying compressed air from the 2-1-th flow path 333-1 to the inner center.

In addition, the rear cover 330 may include a seating portion 335 formed to be concave forward in a predetermined central region of its rear surface for the rotor disk 302 to be seated therein, and a second through hole 334 having an open predetermined region adjacent to an outer periphery of the seating portion 335 for a portion of compressed air conveyed through the second flow path 333 to bypass the rotor disk 302.

In addition, the 2-2-th flow path 333-2 may be inclined in a direction in which the rotor 301 is rotated for the 2-1-th flow path 333-1 to communicate with the seating portion 335.

In addition, the air compressor 1000 for a vehicle may further include a first thrust bearing 303 and a second thrust bearing 304 respectively supporting the front and rear of the rotor disk 302.

In addition, the air compressor 1000 for a vehicle may further include a front journal bearing 305 and a rear journal bearing 306 respectively supporting the front and rear of the rotor 301.

In addition, the air compressor 1000 for a vehicle may further include a front cover 320, wherein the cooling unit 500 includes a first cooling unit P1 where compressed air, passing through the first flow path 311 and the second flow path 333, cools the rotor disk 302, the first thrust bearing 303 and the second thrust bearing 304, and performs the cooling while moving to the front from the rear of the rotor 301 through a region between the rear cover 330, the front cover 320 and the rotor 301.

In addition, the air compressor 1000 for a vehicle may further include a first through hole 122 passing from the rear to front of the front impeller 120, wherein the cooling unit 500 includes a second cooling unit P2 where compressed air cools the front impeller 120 while passing through the first through hole 122.

In addition, the first through hole 122 may be inclined from the outer rear to the central front.

In addition, the air compressor 1000 for a vehicle may further include a third through hole 312 and a fourth through hole 323 respectively open in the motor housing 310 and the front cover 320 for compressed air cooling the inside of the motor housing 310 through the second through hole 334 to move to the second cooling unit P2, wherein the cooling unit 500 includes a third cooling unit P3 where compressed air cools the inside of the motor housing 310 while passing through at least one of the second through hole 334, the third through hole 312 and the fourth through hole 323.

In addition, in the cooling unit 500, the connection pipe 400 and the first flow path 311 may be connected with each other through a cooling pipe 510, and the rear cover 330 may have a sum of cross-sectional areas of the first cooling unit P1 and the second through hole 334 larger than a cross-sectional area of the cooling pipe 510.

In addition, the rotor 301 may include an open shaft unit open in an axial direction to cool the rotor 301 by receiving a portion of compressed air from the rear inlet 211.

Advantageous Effects

As set forth above, the present invention may provide the air compressor for a vehicle in which the entire operation of the air compressor may be stabilized by the cooling unit in which a portion of compressed air that moves through the connection pipe conveying primarily compressed air exchanges heat with the cooling water flowing part to cool the driving unit.

In particular, the present invention may provide the air compressor for a vehicle, which may smoothly cool the driving unit (i.e., air compressor for a vehicle) without requiring the configuration for separately inputting air to use compressed air and any configuration for discharging compressed air which completes the cooling of the driving unit, by performing the cooling using primarily compressed air, and then conveying the same to the inlet (i.e. front inlet) of the first compression unit.

In addition, the present invention may provide the air compressor for a vehicle, having the sufficient cooling performance by including the first cooling unit cooling the rotor and the bearing by conveying compressed air that is cooled by exchanging heat with cooling water while compressed air moves through the first flow path of the motor housing, through the second flow path of the rear cover, the second cooling unit cooling the front impeller through the first through hole of the front impeller, and the third cooling unit bypassing the rotor and cooling the inside of the motor housing, and by further including the open shaft unit enabling a portion of compressed air in the rear inlet to be further cooled while moving from the rear in the rotor to the front thereof in the axial direction.

In addition, the present invention may provide the air compressor for a vehicle, which may have the improved cooling performance of the rotor disk in contact with the first and second thrust bearings by including the 2-2-th flow path of the rear cover, inclined in the direction in which the rotor is rotated, and make a flow of compressed air for performing cooling smoother by adjusting the cross-sectional area of the cooling unit.

BEST MODE

Hereinafter, an air compressor 1000 for a vehicle, having the above-described feature according to the present invention is described in detail with reference to the accompanying drawings.

Figure 1:
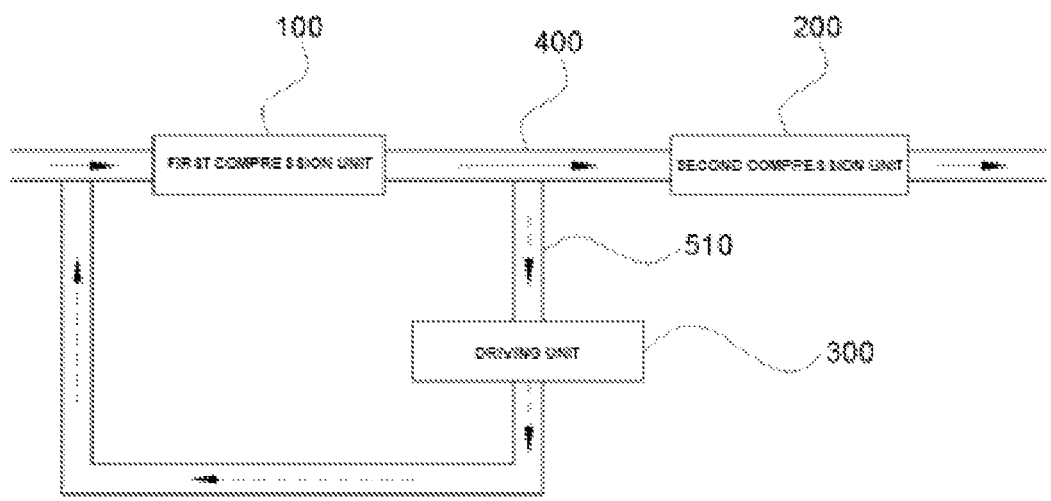
FIG. 1 is a schematic view of an air compressor for a vehicle according to the present invention.
Figure 2:
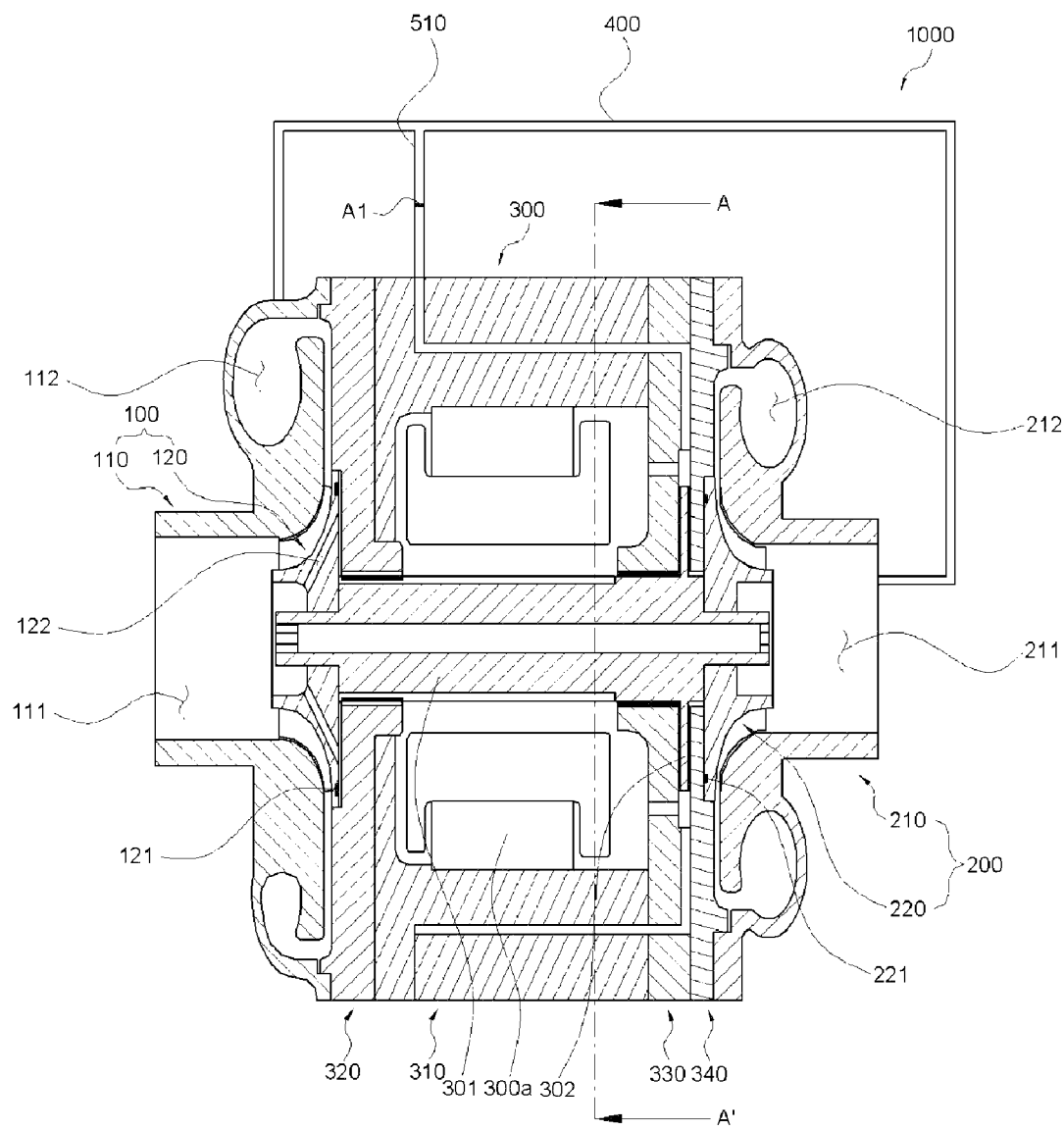
FIGS. 2 and 3 are cross-sectional and enlarged views of the air compressor for a vehicle according to the present invention.
Figure 3:
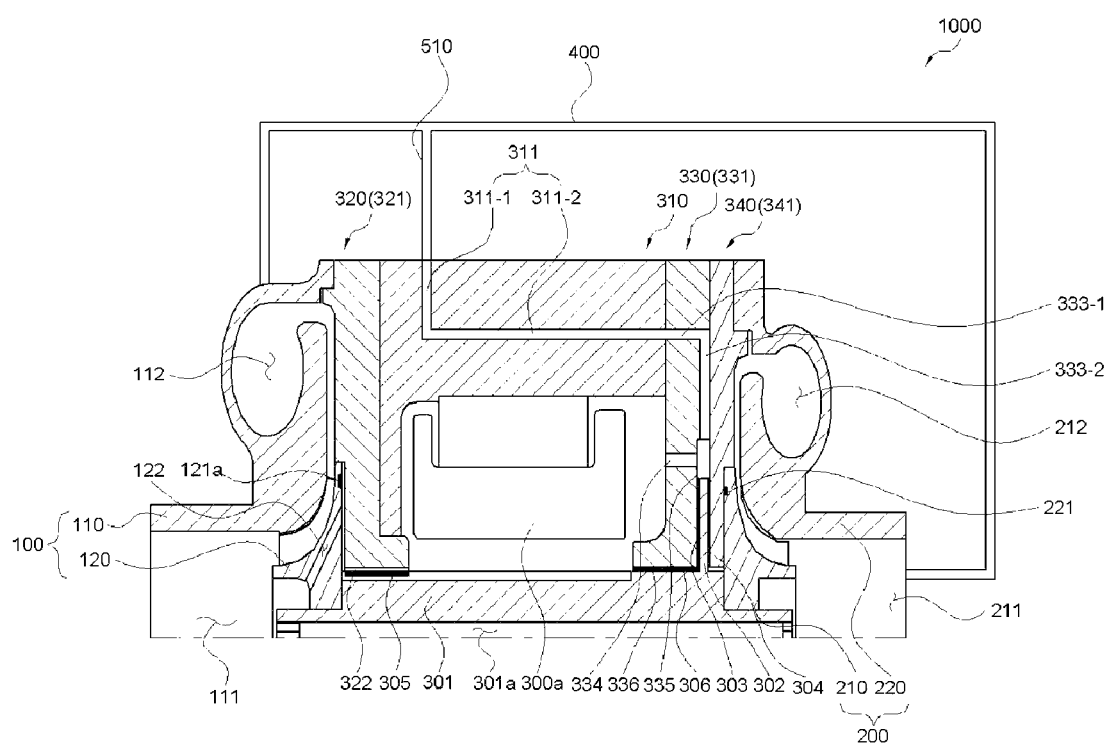
Figure 4:
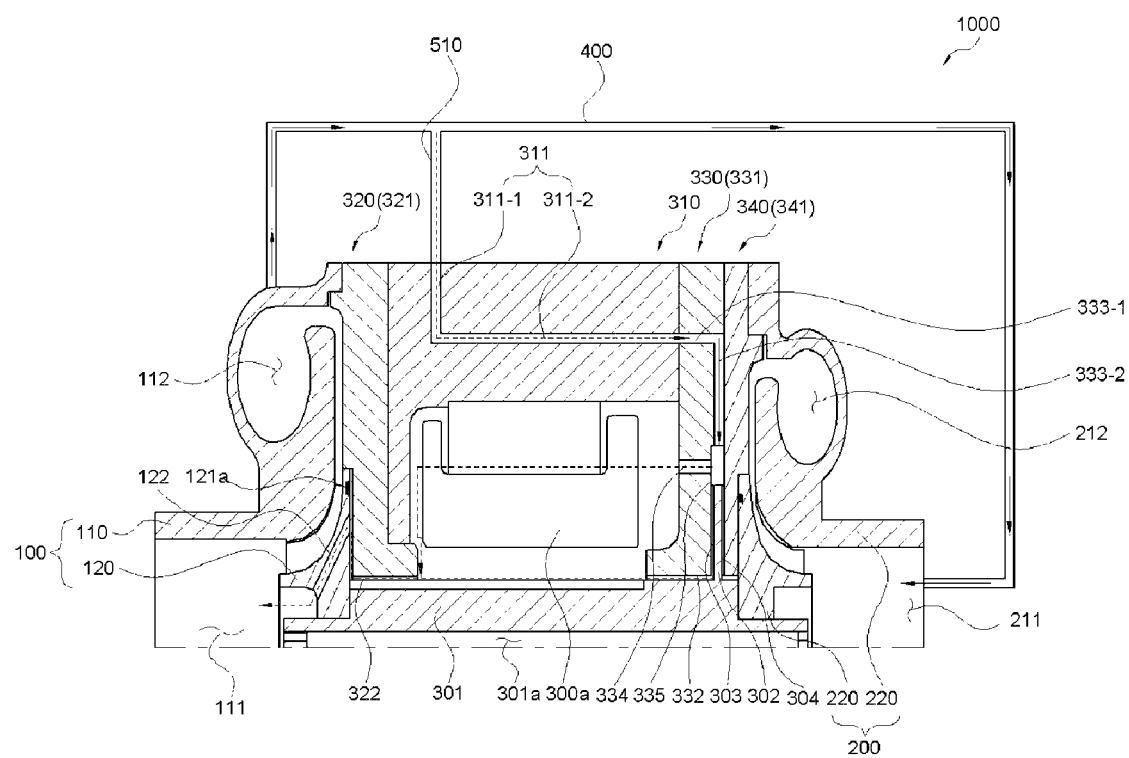
FIG. 4 is a view showing a flow of compressed air in the air compressor for a vehicle shown in FIG. 2 (here, a configuration of a bearing is not shown).
Figure 5:
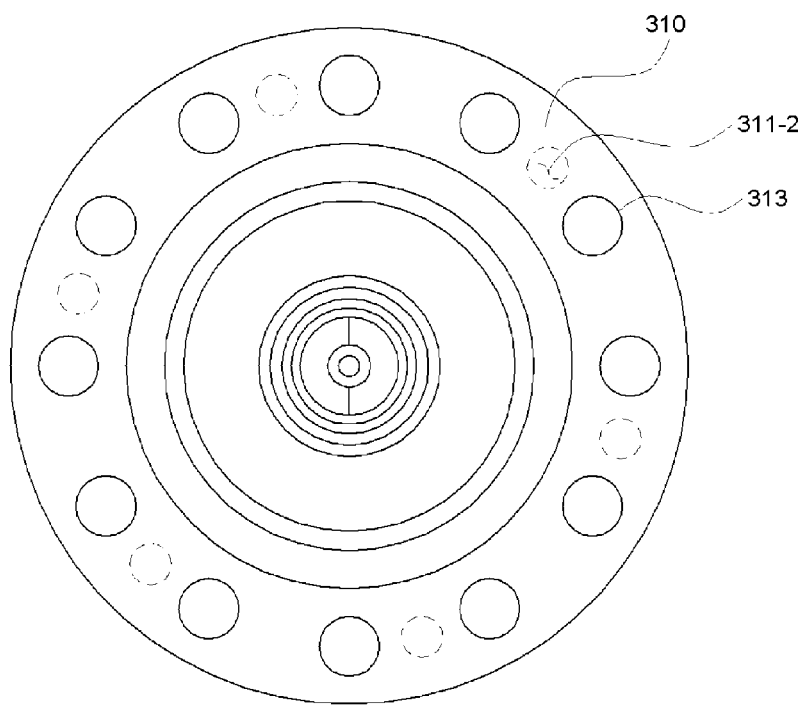
FIG. 5 is a cross-sectional view of FIG. 2 in an AA' direction.
Figure 6:
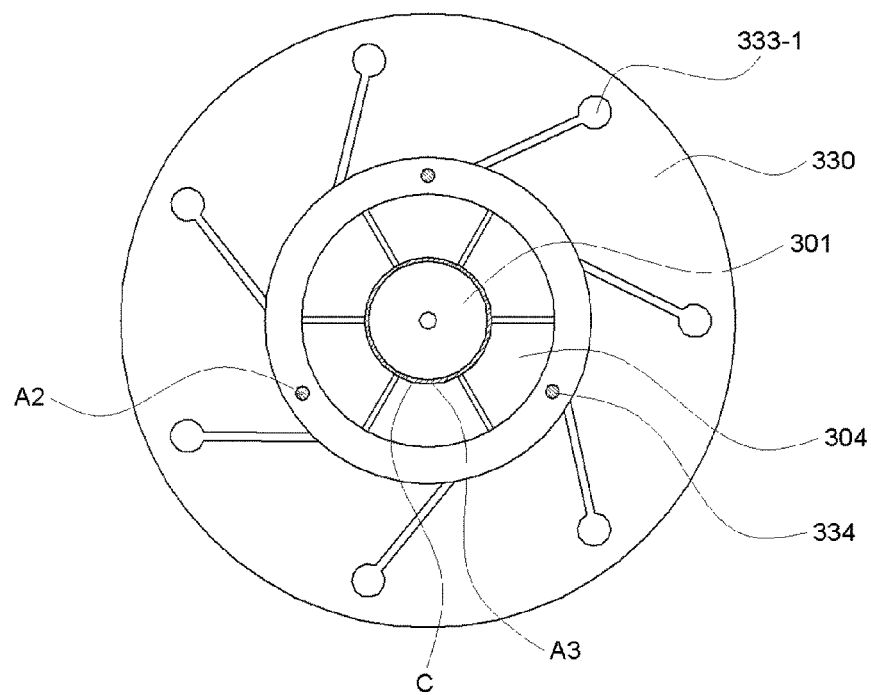
FIG. 6 is a plan view showing a state where a front cover is assembled at the rear of the air compressor for a vehicle according to the present invention toward the front thereof (here, a diffuser is spaced apart therefrom).
Figure 7:
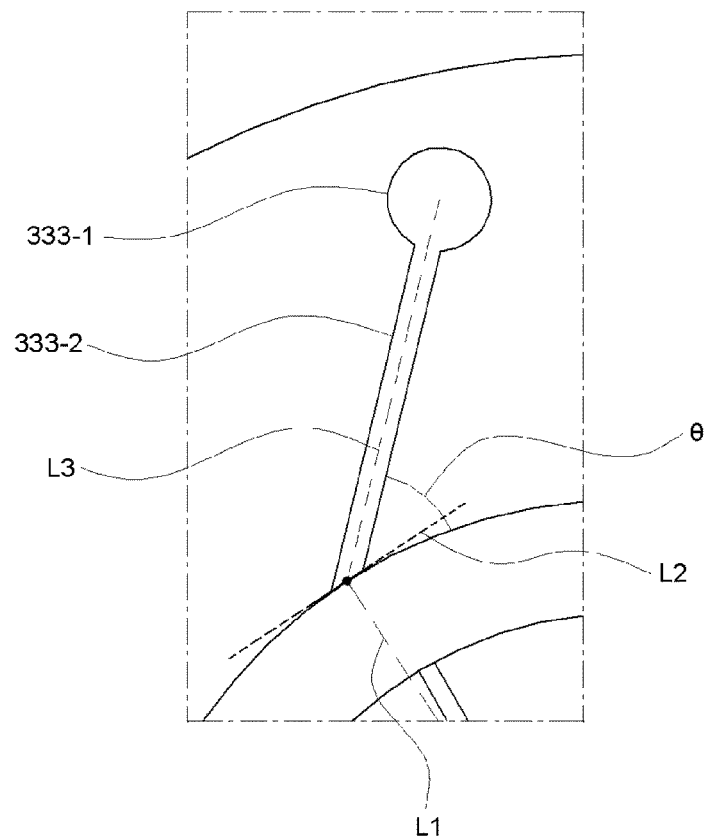
FIG. 7 is a partially enlarged view of FIG. 6.
Figure 8:
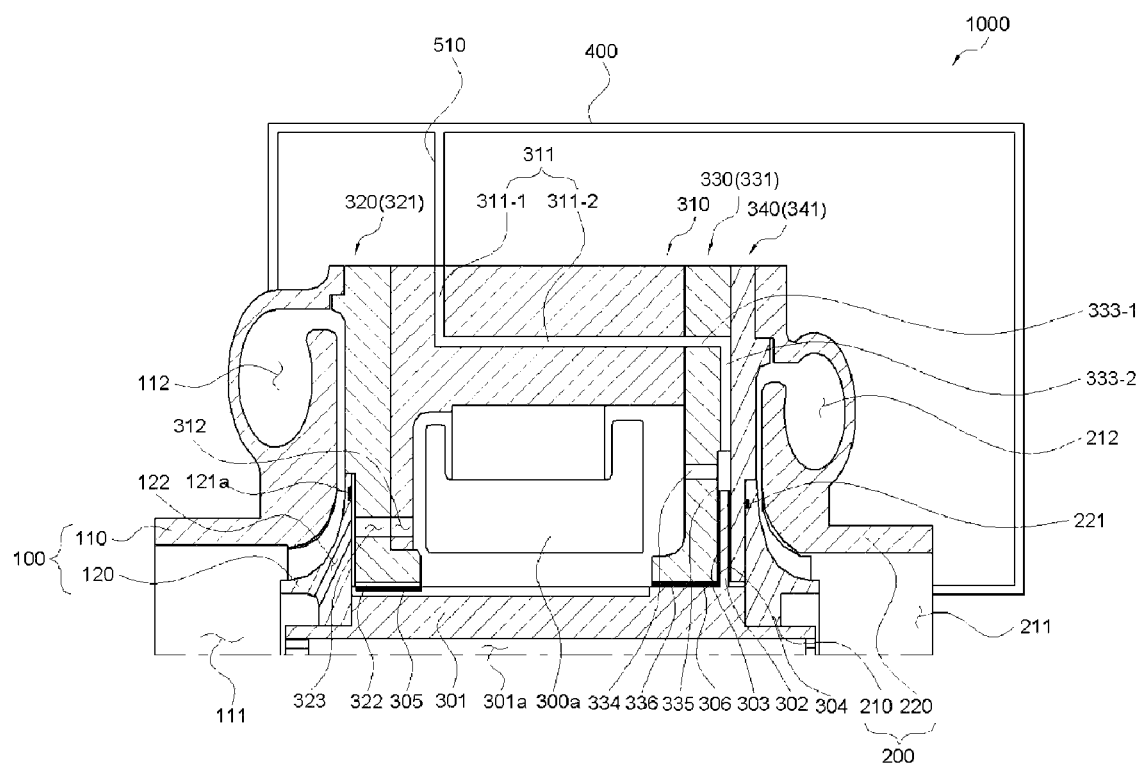
FIGS. 8 and 9 are cross-sectional and enlarged views of the air compressor for a vehicle according to the present invention.
Figure 9:
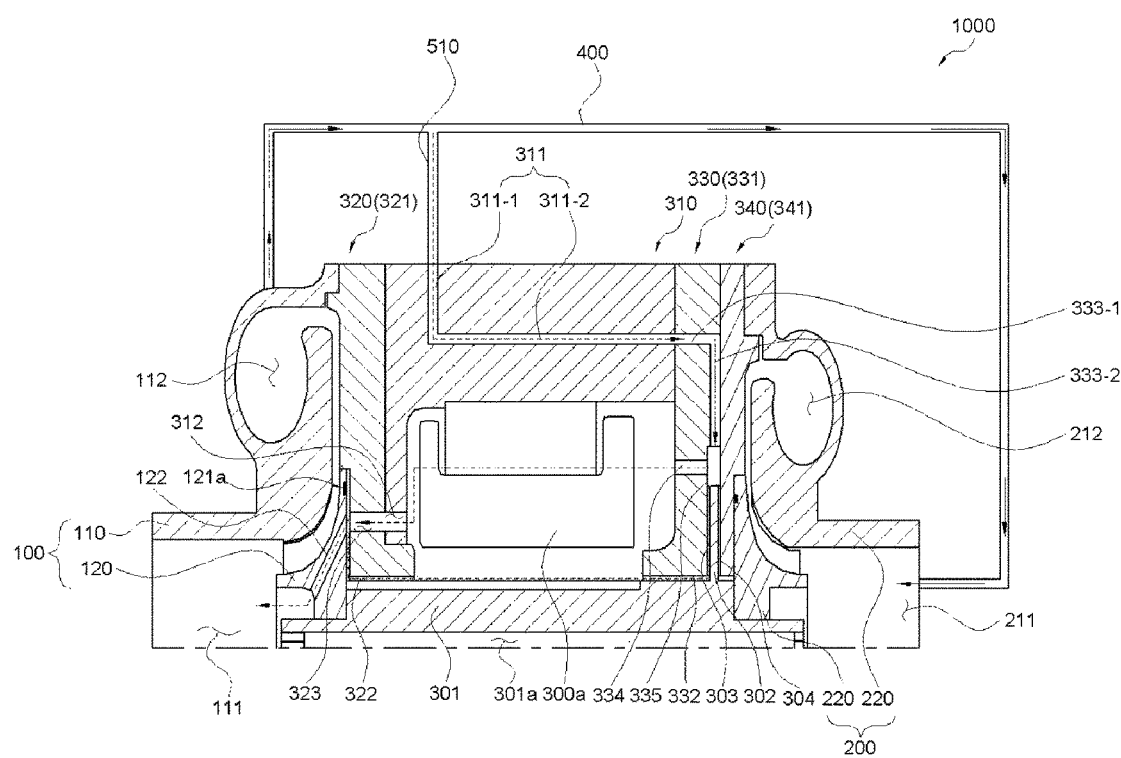

FIG. 1 is a schematic view of the air compressor 1000 for a vehicle according to the present invention, FIGS. 2 and 3 are cross-sectional and enlarged views of the air compressor 1000 for a vehicle according to the present invention, FIG. 4 is a view showing a flow of compressed air in the air compressor 1000 for a vehicle shown in FIG. 2, FIG. 5 is a cross-sectional view of FIG. 2 in an AA' direction, FIG. 6 is a plan view showing a state where a front cover 320 is assembled at the rear of the air compressor 1000 for a vehicle according to the present invention toward the front thereof, FIG. 7 is a partially enlarged view of FIG. 6, and FIGS. 8 and 9 are cross-sectional and enlarged views of the air compressor 1000 for a vehicle according to the present invention.

The air compressor 1000 for a vehicle according to the present invention may include a first compression unit 100, a second compression unit 200, a driving unit 300 and a cooling unit 500.

As shown in FIG. 1, in the air compressor 1000 for a vehicle according to the present invention, air primarily compressed by the first compression unit 100 may be supplied to the second compression unit 200 through a connection pipe 400, and then secondly compressed to be discharged.

First, the first compression unit 100 may be a unit positioned in the front and generating primarily compressed air, and a portion positioned on each left side of the drawings including FIGS. 2, 3, 4, 8 and 9 may be defined as the front.

The first compression unit 100 may include a front housing 110 and a front impeller 120. The front housing 110 may have a front inlet 111 into which air to be compressed is introduced and a front outlet 112 from which the compressed air is discharged, and may be a blower compressed to have a cross-sectional area gradually reduced in a direction in which air introduced into the front inlet 111 moves. Here, the front outlet 112 may be connected to the connection pipe 400 for compressed air to be discharged to the connection pipe 400.

The front impeller 120 may be positioned in the front housing 110 and receive a torque from the driving unit 300 to be rotated and compress air introduced into the front inlet 111. A first sealing member 121 may be positioned on the rear of the front impeller 120.

The second compression unit 200 may include a rear housing 210 and a rear impeller 220. The rear housing 210 may have a rear inlet 211 into which air primarily compressed by the first compression unit 100 is supplied through the connection pipe 400 and a rear outlet 212 from which compressed air is discharged, and may be a blower compressed to have a cross-sectional area gradually reduced in a direction in which air introduced into the rear inlet 211 moves.

The rear impeller 220 may be positioned in the rear housing 210 and receive the torque from the driving unit 300 to be rotated and compress air introduced into the rear inlet 211. A second sealing member 221 may be positioned on the front of the rear impeller 220.

The driving unit 300 may include a motor housing 310, a stator 300a, a rotor 301 and a rotor disk 302.

The motor housing 310 may be a basic body of the driving unit 300, and positioned between the front housing 110 and the rear housing 210. In addition, the motor housing 310 may include a cooling water flowing part 313 which is a space where cooling water flows. The cooling water flowing part 313 may cool the motor housing 310 itself by a water cooling method while cooling water flows therein, and simultaneously cool compressed air passing through the cooling unit 500, and the cooling may thus also be achieved by an air cooling method. A specific configuration of the cooling unit 500 is described below.

In addition, the motor housing 310 may include the stator 300a, the rotor 301 and the rotor disk 302 positioned therein.

The stator 300a may be coupled and fixed to an inner peripheral surface of the motor housing 310, and include a plate and a coil.

The rotor 301 may include one side, i.e. the front coupled to the front impeller 120 of the first compression unit 100 and the other side, i.e. the rear coupled with the rear impeller 220 of the second compression unit 200 to rotate the front impeller 120 and the rear impeller 220. Here, the rotor disk 302 may be integrally formed with the rotor 301. When receiving external power, the rotor 301 may generate the torque by electromagnetic interaction with the stator, the front impeller 120 and the rear impeller 220 may be rotated by the force, and air may thus be primarily and secondarily compressed.

Here, the air compressor 1000 for a vehicle according to the present invention may be a rear runner type in which the rotor disk 302 is positioned at the rear. Accordingly, a portion of compressed air flowing through the connection pipe 400 may be introduced, may exchange heat with the cooling water flowing part 313 while moving from the front to the rear, and may be supplied to the rotor disk 302 in a cool state, thereby smoothly performing the cooling.

In addition, the air compressor 1000 for a vehicle according to the present invention may include a bearing to facilitate the rotation of the rotor 301, a first thrust bearing 303 and a second thrust bearing 304 respectively supporting the front and rear of the rotor disk 302, and a front journal bearing 305 and a rear journal bearing 306 respectively supporting the front and rear of the rotor 301.

The air compressor 1000 for a vehicle according to the present invention may include the front cover 320 positioned between the front housing 110 and the motor housing 310, and a rear cover 330 and a diffuser 340 positioned between the motor housing 310 and the rear housing 210.

The front cover 320 may be made of a plate-shaped first plate portion 321 mounted on the front of the motor housing 310, and include a first mounting portion 322 open for the rotor 301 to be inserted into the center of the first plate portion 321. The front journal bearing 305 may be positioned in a region where the first mounting portion 322 of the front cover 320 is positioned. Here, the front cover 320 may have a space, where the front impeller 120 and the front housing 110 are mounted, on the front, and may have the rear which blocks the front of the motor housing 310.

The rear cover 330 may be made of a plate-shaped second plate portion 331 mounted on the rear of the motor housing 310, and include a second mounting portion 332 open for the rotor 301 to be inserted into the center of the second plate portion 331. The rear journal bearing 306 may be positioned in a region where the second mounting portion 332 of the rear cover 330 is positioned. The rear cover 330 may include a seating portion 335 formed to be concave forward in a predetermined central region of its rear surface for the rotor disk 302 to be seated therein.

The diffuser 340 may be positioned on the rear of the rear cover 330 to have a space, where the rear cover 330 and the rotor disk 302 are positioned, on the front, and may have a space, where the rear impeller 220 is positioned between the diffuser and the housing 210, on the rear.

The diffuser 340 may also be made of a plate-shaped third plate portion 341, and include a third mounting portion 342 open for the rotor 301 to be inserted into the center of the third plate portion 341.

Compressed air passing through the connection pipe 400, i.e. a portion of air primarily compressed by the first compression unit 100 and conveyed to the second compression unit 200, may be introduced into the cooling unit 500 of the present invention, exchange heat with the cooling water flowing part 313 to cool the driving unit 300.

First, the cooling unit 500 may include a first flow path 311 of the motor housing 310.

The first flow path 311 may include a 1-1-th flow path 311-1 for conveying compressed air from the outer peripheral surface to inner center of the motor housing 310, and a 1-2-th flow path 311-2 for conveying compressed air from the 1-1-th flow path 311-1 to the rear thereof.

The 1-2-th flow path 311-2 may be parallel to the cooling water flowing part 313, and compressed air flowing therein may thus be cooled by exchanging heat with the cooling water flowing part 313. FIG. 5 shows that twelve cooling water flowing parts 313 and six 1-2-th flow paths 311-2 are positioned in a circumferential direction. However, the air compressor 1000 for a vehicle according to the present invention is not limited thereto, and may include the corresponding components having more various numbers and sizes.

In addition, the cooling unit 500 may include a second flow path 333 of the rear cover 330.

The second flow path 333 may be a flow path for supplying cooled compressed air supplied from the first flow path 311 to the rotor disk 302, and include a 2-1-th flow path 333-1 open for communicating with the 1-2-th flow path 311-2 and a 2-2-th flow path 333-2 for conveying compressed air from the 2-1-th flow path 333-1 to the inner center. Here, the 2-2-th flow path 333-2 may have one side communicating with the 2-1-th flow path 333-1 and the other side formed to be concave in a predetermined region of the rear surface of the rear cover 330, and may communicate with the seating portion 335 seating the rotor disk 302 thereon.

Here, it may be preferable that the 2-2-th flow path 333-2 is inclined in a direction in which the rotor 301 is rotated for the 2-1-th flow path 333-1 to communicate with the seating portion 335. FIGS. 6 and 7 are plan views from the rear, each showing a state where the rotor 301, the rotor disk 302, and the second thrust bearing 304 are mounted, and the diffuser 340 is detached, and referring to FIGS. 6 and 7, one side of the 2-2-th flow path 333-2 in an outer circumferential direction may communicate with the 2-1 flow path 333-1, and the other side may communicate with the seating portion 335. The drawing shows that the 2-2-th flow path 333-2 is inclined in a counterclockwise direction which is the direction in which the rotor 301 is rotated. Through this configuration, the air compressor 1000 for a vehicle of the present invention may preferably allow cooled compressed air to be smoothly supplied to an edge region of the first or second thrust bearing 303 or 304, where the most wear-out is induced, thereby achieving the sufficient cooling. In more detail, in FIG. 7, L1 indicates a radius from the center of the rotor 301 to a portion where the 2-2-th flow path 333-2 and the seating portion 335 are in contact with each other, L2 indicates a tangent of L1, and L3 indicates a center line of the 2-2-th flow path 333-2. That is, when θ indicates the smaller one of angles between L2 and L3, θ may be less than 90°, and its inclined direction may be the direction in which the rotor 301 is rotated. Here, a value of θ may be appropriately adjusted, and may preferably be formed small in a region where θ is able to be manufactured, thereby allowing compressed air to smoothly flow toward locations where the rotor disk 302, the first thrust bearing 303 and the second thrust bearing 304 are positioned.

Compressed air supplied from the first flow path 311 and the second flow path 333 may basically cool internal components by using a first cooling unit P1.

The first cooling unit P1 may indicate a space where compressed air moves to the front from the rear on which the rotor disk 302 is positioned and performs the cooling. In more detail, in the first cooling unit P1, compressed air conveyed through the first flow path 311 and the second flow path 333 may cool the rotor disk 302, the first thrust bearing 303 and the second thrust bearing 304, and cool the rotor 301 while moving from the rear to the front along an outer peripheral surface of the rotor 301.

In addition, in the air compressor 1000 for a vehicle according to the present invention, the cooling unit 500 may include a second cooling unit P2 to allow compressed air passing through the first cooling unit P1 to cool the front impeller 120, and then be discharged to the front inlet 111 of the front housing 110.

The second cooling unit P2 may indicate a space where compressed air moves through a first through hole 122 positioned in the front impeller 120. Here, there is a flow that air passing through the first cooling unit P1 cools the front impeller 120 while moving to the front from the rear of the front impeller 120 through the first through hole 122, is conveyed to the front inlet 111 to be compressed again by the first compression unit 100.

That is, there is no need for a separate flow path for discharging compressed air to cool the air compressor 1000 for a vehicle according to the present invention, and compressed air used to cool the compressor may be compressed by the first compression unit 100 again and then supplied to the compressor.

Here, it may be preferable that the first through hole 122 is inclined from the outer rear to the central front, such that compressed air for the cooling cools a rear surface of the front impeller 120, and is then conveyed to the first through hole 122, thus effectively cooling the front impeller 120.

In addition, in the air compressor 1000 for a vehicle according to the present invention, the cooling unit 500 may further include a third cooling unit P3.

The third cooling unit P3 may indicate a space where a flow separate from the flow of the first cooling unit P1 is formed. Here, a portion of compressed air conveyed through the first flow path 311 and the second flow path 333 may not be supplied to the rotor disk 302, the first thrust bearing 303 and the second thrust bearing 304, may be supplied into the motor housing 310 through a second through hole 334 which is a through hole passing through the rear cover 330 and perform the cooling, and then join to the first cooling unit P1 to be discharged.

The second through hole 334 may indicate a hole having an open predetermined region in an outer periphery of the seating portion 335 in which the rotor disk 302 is not positioned.

Further, as shown in FIGS. 8 and 9, compressed air cooled by being supplied into the motor housing 310 through the second through hole 334 may be directly conveyed to the second cooling unit P2 to be discharged. In this case, the third cooling unit P3 may include a third through hole 312 and a fourth through hole 323, respectively open in the motor housing 310 and the front cover 320, such that compressed air cooling the inside of the motor housing 310 through the second through hole 334 may be conveyed to the second cooling unit P2 through the third through hole 312 and the fourth through hole 323.

Meanwhile, in the cooling unit 500, the connection pipe 400 and the first flow path 311 may be connected with each other through a cooling pipe 510. Here, it may be preferable that the rear cover 330 has a sum of cross-sectional areas of the first cooling unit P1 and the second through hole 334 larger than a cross-sectional area of the cooling pipe 510.

The cross-sectional area of the first cooling unit P1 may indicate a region between the second mounting portion 332 and rotor 301 of the rear cover, and may indicate an area in which compressed air may move, and the same is shown in FIG. 5.

When the plurality of the second through holes 334 are provided, the cross-sectional area of the second through hole 334 may indicate the total cross-sectional areas of the second through holes.

The air compressor 1000 for a vehicle according to the present invention may allow compressed air to have a further improved cooling performance by making the flow of compressed air smoother because the sum of the cross-sectional areas of the first cooling unit P1 and the cross-sectional area of the second through hole 334 is larger than the cross-sectional area of the cooling pipe 510 in the region where compressed air for the cooling is introduced.

That is, the cooling unit 500 may smoothly cool the inside of the air compressor 1000 for a vehicle while compressed air passes through the first flow path 311 and the second flow path 333, passes through one of the flow paths of the first cooling unit P1 and the third cooling unit P3, and then passes through the second cooling unit P2, and may then be discharged to the front inlet 111 to join other air introduced into the compressor to be compressed. Accordingly, the air compressor 1000 for a vehicle according to the present invention may have further improved cooling performance without a need for any separate configuration for conveying compressed air or any separate configuration for discharging compressed air that completes the cooling.

The present invention is not limited to the above-mentioned embodiments, and may be variously applied. In addition, the present invention may be variously modified by those skilled in the art to which the present invention pertains without departing from the gist of the present invention claimed in the claims.

DETAILED DESCRIPTION OF MAIN ELEMENTS

1000: air compressor for vehicle, 100: first compression unit, 110: front housing,
111: front inlet, 112: front outlet, 120: front impeller,
121: first sealing member, 122: first through hole, 200: second compression unit,
210: rear housing, 211: rear inlet, 212: rear outlet,
220: rear impeller, 221: second sealing member, 300: driving unit,
300a: stator, 301: rotor, 301a: open shaft unit,
302: rotor disk, 303: first thrust bearing,
304: second thrust bearing, 305: front journal bearing,
306: rear journal bearing, 310: motor housing,
311: first flow path (311-1: 1-1-th flow path, 311-2: 1-2-th flow path),
312: third through hole, 313: cooling water flowing part, 320: front cover,
321: first plate portion, 322: first mounting portion, 323: fourth through hole,
330: rear cover, 331: second plate portion, 332: second mounting portion,
333: second flow path (333-1: 2-1-th flow path, 333-2: 2-2-th flow path),
334: second through hole, 335: seating portion (having space where rotor disk is mounted),
340: diffuser, 341: third plate portion, 342: third mounting portion,
400: connection pipe, 500: cooling unit, 510: cooling pipe,
P1: first cooling unit, P2: second cooling unit, P3: third cooling unit (bypass flow path),
A1: first cross-sectional area, A2: second cross-sectional area (region where second through hole is through),
A3: third cross-sectional area (region between second mounting portion and rotor of rear cover)

The invention claimed is:

1. An air compressor for a vehicle, comprising:
a first compression unit including a front housing having a front inlet into which air to be compressed is introduced and a front outlet from which compressed air is discharged, and a front impeller positioned in the front housing;
a second compression unit including a rear housing having a rear inlet which is connected to the front outlet of the first compression unit through a connection pipe, and into which air passing through the first compression unit is introduced and a rear outlet from which compressed air is discharged, and a rear impeller positioned in the rear housing;

a driving unit having the front housing and the rear housing respectively positioned on the front and rear thereof, and including a motor housing having a cooling water flowing part in which cooling water flows, a stator coupled to an inner peripheral surface of the motor housing, a rotor rotated in the stator and a rotor disk integrally formed with the rotor to drive the front impeller and the rear impeller; and a cooling unit into which a portion of compressed air compressed by the first compression unit and flowing through the connection pipe is introduced, exchanges heat with the cooling water to cool the driving unit.

2. The air compressor for a vehicle of claim 1, wherein the air compressor for a vehicle is a rear runner type in which the rotor disk is positioned at the rear, and the cooling unit is positioned long in a length direction of the motor housing and includes a first flow path exchanging heat with the cooling water flowing part.

3. The air compressor for a vehicle of claim 2, wherein the first flow path includes a 1-1-th flow path for conveying compressed air from the outer peripheral surface to inner center of the motor housing, and a 1-2-th flow path for conveying compressed air from the 1-1-th flow path to the rear thereof.

4. The air compressor for a vehicle of claim 3, further comprising a rear cover and a diffuser, positioned between the motor housing and the rear housing to support the rotor disk, wherein the rear cover includes a second flow path for receiving compressed air conveyed from the first flow path and conveying the same to the rotor disk.

5. The air compressor for a vehicle of claim 4, wherein the second flow path includes a 2-1-th flow path open for communicating with the 1-2-th flow path, and a 2-2-th flow path for conveying compressed air from the 2-1-th flow path to the inner center.

6. The air compressor for a vehicle of claim 5, wherein the rear cover includes a seating portion formed to be concave forward in a predetermined central region of its rear surface for the rotor disk to be seated therein, and a second through hole having an open predetermined region adjacent to an outer periphery of the seating portion for a portion of compressed air conveyed through the second flow path to bypass the rotor disk.

7. The air compressor for a vehicle of claim 5, wherein the 2-2-th flow path is inclined in a direction in which the rotor is rotated for the 2-1-th flow path to communicate with the seating portion.

8. The air compressor for a vehicle of claim 6, further comprising a first thrust bearing and a second thrust bearing respectively supporting the front and rear of the rotor disk.

9. The air compressor for a vehicle of claim 8, further comprising a front journal bearing and a rear journal bearing respectively supporting the front and rear of the rotor.

10. The air compressor for a vehicle of claim 9, further comprising a front cover, wherein the cooling unit includes a first cooling unit where compressed air, passing through the first flow path and the second flow path, cools the rotor disk, the first thrust bearing and the second thrust bearing, and performs the cooling while moving to the front from the rear of the rotor through a region between the rear cover, the front cover and the rotor.

11. The air compressor for a vehicle of claim 10, further comprising a first through hole passing from the rear to front of the front impeller, wherein the cooling unit includes a second cooling unit where compressed air cools the front impeller while passing through the first through hole.

12. The air compressor for a vehicle of claim 11, wherein the first through hole is inclined from the outer rear to the central front.

13. The air compressor for a vehicle of claim 12, further comprising a third through hole and a fourth through hole respectively open in the motor housing and the front cover for compressed air cooling the inside of the motor housing through the second through hole to move to the second cooling unit, wherein the cooling unit includes a third cooling unit where compressed air cools the inside of the motor housing while passing through at least one of the second through hole, the third through hole and the fourth through hole.

14. The air compressor for a vehicle of claim 13, wherein in the cooling unit, the connection pipe and the first flow path are connected with each other through a cooling pipe, and the rear cover has a sum of cross-sectional areas of the first cooling unit and the second through hole larger than a cross-sectional area of the cooling pipe.

15. The air compressor for a vehicle of claim 13, wherein the rotor includes an open shaft unit open in an axial direction to cool the rotor by receiving a portion of compressed air from the rear inlet.

* * * * *